(No Model.)

T. P. TAYLOR.
BASE BALL.

No. 298,041. Patented May 6, 1884.

Witnesses:
John J. Hinkel
H. E. Hansmann

Inventor:
T. P. Taylor
By Foster & Freeman
Attys

N. PETERS, Photo-Lithographer, Washington, D. C.

UNITED STATES PATENT OFFICE.

THOMAS P. TAYLOR, OF BRIDGEPORT, CONNECTICUT.

BASE-BALL.

SPECIFICATION forming part of Letters Patent No. 298,041, dated May 6, 1884.

Application filed March 7, 1884. (No model.)

*To all whom it may concern:*

Be it known that I, THOMAS P. TAYLOR, a citizen of the United States, and a resident of the city of Bridgeport, county of Fairfield, and State of Connecticut, have invented certain new and useful Improvements in Base-Balls, of which the following is a specification.

My invention consists in certain improvements in the manufacture of base-balls, whereby the construction is facilitated and cheapened and the quality of the ball is improved.

Figure 1:
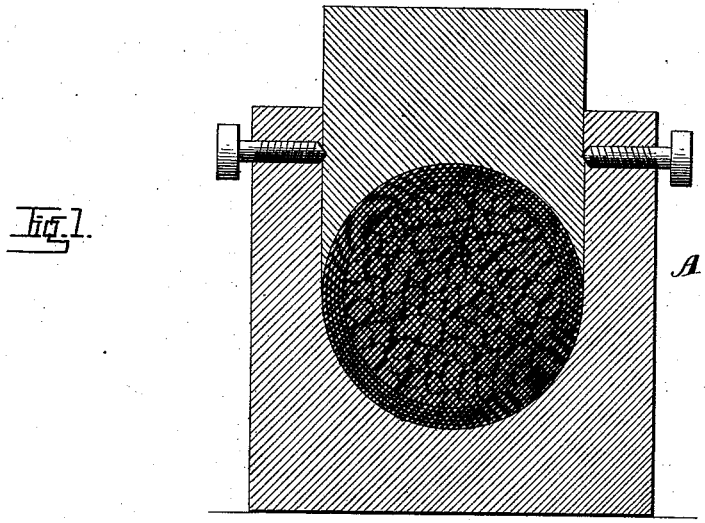
Figure 2:
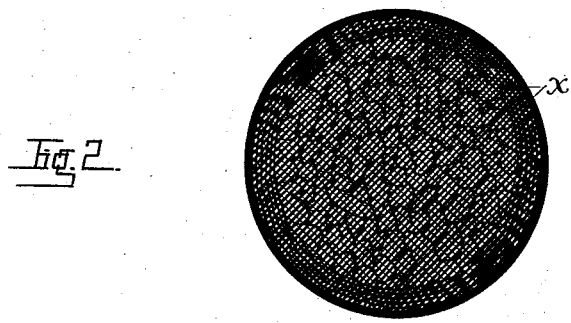

In the drawings, Figure 1 is a section of the mold used in my improved mode of manufacture. Fig. 2 is a section of the improved ball.

The main object of my invention is to utilize cotton-seed hulls, scrap, waste, and other refuse materials such as may be found in corset-factories, shoe-making establishments, &c., where there are always large amounts of cotton-seed hulls, cuttings of leather, cloth, and other materials. Such materials, especially when in a finely-divided state, have not been well adapted for use in balls, in consequence of the liability of the particles to separate or become loose and work their way toward the other portions of the ball. I utilize such materials in the manufacture of the body portion of the ball by taking a mass of the hulls or scrap, compacting it by hand as closely as possible, and then spreading over and around the same a layer of tow, hemp combings, or combings of istle fiber, or other fibrous material in the form of a sheet or mat. The fibers of this sheet closely confine the loose scraps and prevent their displacement, and hold them together without the loss and liability of subsequent displacement that would result from attempting to confine them by a twine wrapping, while the operation is much more speedily performed. After the hulls or scraps are thoroughly covered and confined, the mass is placed in a mold, A, and consolidated under pressure to the required dimensions, and is then subjected to such heat as will temper and set it in its shape, so that when removed it is solid, hard, and will not expand, but will retain its shape. The body thus formed is then, if the ball is of a common grade, covered directly with the usual kid or other covering, x; but for finer grades the body is covered with layers of yarn or cord by wrapping until it is of the desired dimensions, after which the external covering is applied as usual. In some instances a core or center-piece of rubber or cork is embedded in the center of the mass of scrap before compression and baking.

The whole filling of the ball may be of cotton-seed hulls or other scrap or waste materials, or the different materials may be combined in various proportions, or with well-known materials.

I claim—

1. In the manufacture of base-balls, forming a center by collecting a mass of loose materials, inclosing the mass in hemp combings or like fibrous material, then consolidating and baking under pressure, and then applying the external covering, substantially as set forth.

2. A base-ball consisting of a consolidated mass of loose waste materials inclosed in a wrapper of hemp combings or like material, and with an outer covering, as specified.

3. A base-ball in which the filling portion of loose materials is confined by an outer layer of hemp combings or other like material, substantially as described.

In testimony whereof I have signed my name to this specification in the presence of two subscribing witnesses.

THOS. P. TAYLOR.

Witnesses:
 AUGUSTA TAYLOR,
 ALFRED TAYLOR, Jr.